United States Patent
Stratton

(10) Patent No.: US 8,417,735 B1
(45) Date of Patent: Apr. 9, 2013

(54) INSTRUCTION-EFFICIENT ALGORITHM FOR PARALLEL SCAN USING INITIALIZED MEMORY REGIONS TO REPLACE CONDITIONAL STATEMENTS

(75) Inventor: John A. Stratton, Champaign, IL (US)

(73) Assignee: Nvidia Corporation, Santa Clara, CA (US)

( * ) Notice: Subject to any disclaimer, the term of this patent is extended or adjusted under 35 U.S.C. 154(b) by 1040 days.

(21) Appl. No.: 11/955,313

(22) Filed: Dec. 12, 2007

(51) Int. Cl.
*G06F 17/30* (2006.01)

(52) U.S. Cl. ........ 707/803; 707/758; 707/791; 707/801; 712/220

(58) Field of Classification Search ............... 707/999.1, 707/999.101, 7, 101, 1, 705, 758, 803, 791, 707/801; 712/220, 204; 718/101, 104
See application file for complete search history.

(56) References Cited

U.S. PATENT DOCUMENTS

| | | | |
|---|---|---|---|
| 7,020,879 B1 * | 3/2006 | Nemirovsky et al. | 718/107 |
| 7,113,985 B2 * | 9/2006 | Narad et al. | 709/221 |
| 7,210,023 B2 * | 4/2007 | Rose et al. | 712/204 |
| 7,313,788 B2 * | 12/2007 | Ben-David et al. | 717/150 |
| 7,523,293 B2 * | 4/2009 | Vishkin | 712/30 |
| 7,650,605 B2 * | 1/2010 | Melvin et al. | 718/104 |
| 2007/0260663 A1 * | 11/2007 | Frigo et al. | 708/490 |
| 2008/0276064 A1 * | 11/2008 | Munshi et al. | 711/173 |
| 2008/0316214 A1 * | 12/2008 | Peeper | 345/501 |
| 2009/0125907 A1 * | 5/2009 | Wen et al. | 718/101 |
| 2009/0132878 A1 * | 5/2009 | Garland et al. | 714/729 |

FOREIGN PATENT DOCUMENTS

| WO | WO 2008/127610 | 10/2008 |
|---|---|---|
| WO | WO 2008/127622 | 10/2008 |
| WO | WO 2008/127623 | 10/2008 |

OTHER PUBLICATIONS

Moss, et al. "Toward Acceleration of RSA Using 3D Graphics Hardware," LNCS 4887, Dec. 2007, pp. 369-388.

* cited by examiner

*Primary Examiner* — Fred I Ehichioya
*Assistant Examiner* — Dangelino Gortayo
(74) *Attorney, Agent, or Firm* — Patterson & Sheridan, LLP

(57) ABSTRACT

One embodiment of the present invention sets forth a technique for performing a parallel scan operation with high computational efficiency in a single-instruction multiple-data (SIMD) environment. Each participating thread initially writes an extended region of a data array to initialize the region with an identity value. For example, a value of zero is used as the identity value for addition. The initialized region of the data array includes an initialized entry for every possible out of bounds index that may be computed in the normal course of the parallel scan operation. During the parallel scan operation each thread computes data array indices according to any technically appropriate technique. When a participating thread computes an index that would conventionally be out of bounds, the thread is able to retrieve an identity value from the initialized region of the data array rather than perform a bounds check that returns the identity value.

20 Claims, 7 Drawing Sheets

INSTRUCTION-EFFICIENT ALGORITHM FOR PARALLEL SCAN USING INITIALIZED MEMORY REGIONS TO REPLACE CONDITIONAL STATEMENTS

BACKGROUND OF THE INVENTION

1. Field of the Invention

Embodiments of the present invention relate generally to parallel processing and more specifically to an instruction-efficient algorithm for parallel scan using initialized memory regions to replace conditional statements.

2. Description of the Related Art

A parallel scan, also commonly known as a parallel prefix sum when addition is the associative operator, is a useful building block for many other parallel algorithms, such as sorting data and generating data structures. The parallel scan is a particularly useful algorithm for use in modern single-instruction multiple-data (SIMD) processors, such as graphics processing units (GPUs), which are being deployed to solve an increasingly general set of computational tasks.

A conventional parallel scan algorithm distributes a set of N input elements to a set of processing threads, which generate an array of N output elements through one or more processing passes. In a first processing pass, each processing thread typically accesses two values in the array of N input elements to generate one output that is stored in the array of N output elements. In each subsequent processing pass, a given thread conventionally accesses two values in the array of N output elements to generate one new output element. In a typical implementation, each thread retrieves one data element from an array index associated with the thread identification number and one data element from an offset that increases with each processing pass. As each thread computes an offset for each processing pass, the thread needs to avoid exceeding the memory boundaries established for the array of N output elements. To avoid exceeding array boundaries in memory, each thread performs bounds checking using one or more conditional operators. When an index goes out of bounds, an identity value (e.g., zero for addition) is returned for use in any related computations.

In a SIMD processing model, any thread executing a failed conditional operator must execute one or more place holder (null) instructions, to maintain instruction-level synchronization with the remaining threads in the associated thread group. When a conventional parallel scan operation is implemented in a SIMD processing model, the instructions executed to perform bounds checking by each thread in each pass reduce the overall efficiency of every thread in the thread group.

As the foregoing illustrates, what is needed in the art is a technique for efficiently performing a parallel scan operation in a SIMD multi-processor, such as a modern GPU.

SUMMARY OF THE INVENTION

One embodiment of the present invention sets forth a method for performing a parallel scan operation. The method includes the steps of computing a base index in a shared data array, determining that a loop index is less than a maximum reduction number, retrieving data from the shared data array at a first location defined by a base index minus two raised to the loop index, performing an operation between the data retrieved from the first location in the shared data array and data stored in the shared data array at a second location defined by the base index to generate processed data; and storing the processed data in the shared data array at the second location.

One advantage of the disclosed method is that, in so performing the parallel scan operation, each thread in a thread group computes data array indices according to any technically appropriate technique. When a participating thread computes an index that would conventionally be out of bounds, the thread is able to retrieve an identity value from the initialized region of the data array rather than perform a bounds check that returns the identity value. Thus, the approach provides a parallel scan operation having high computational efficiency in a single-instruction multiple-data (SIMD) environment, relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
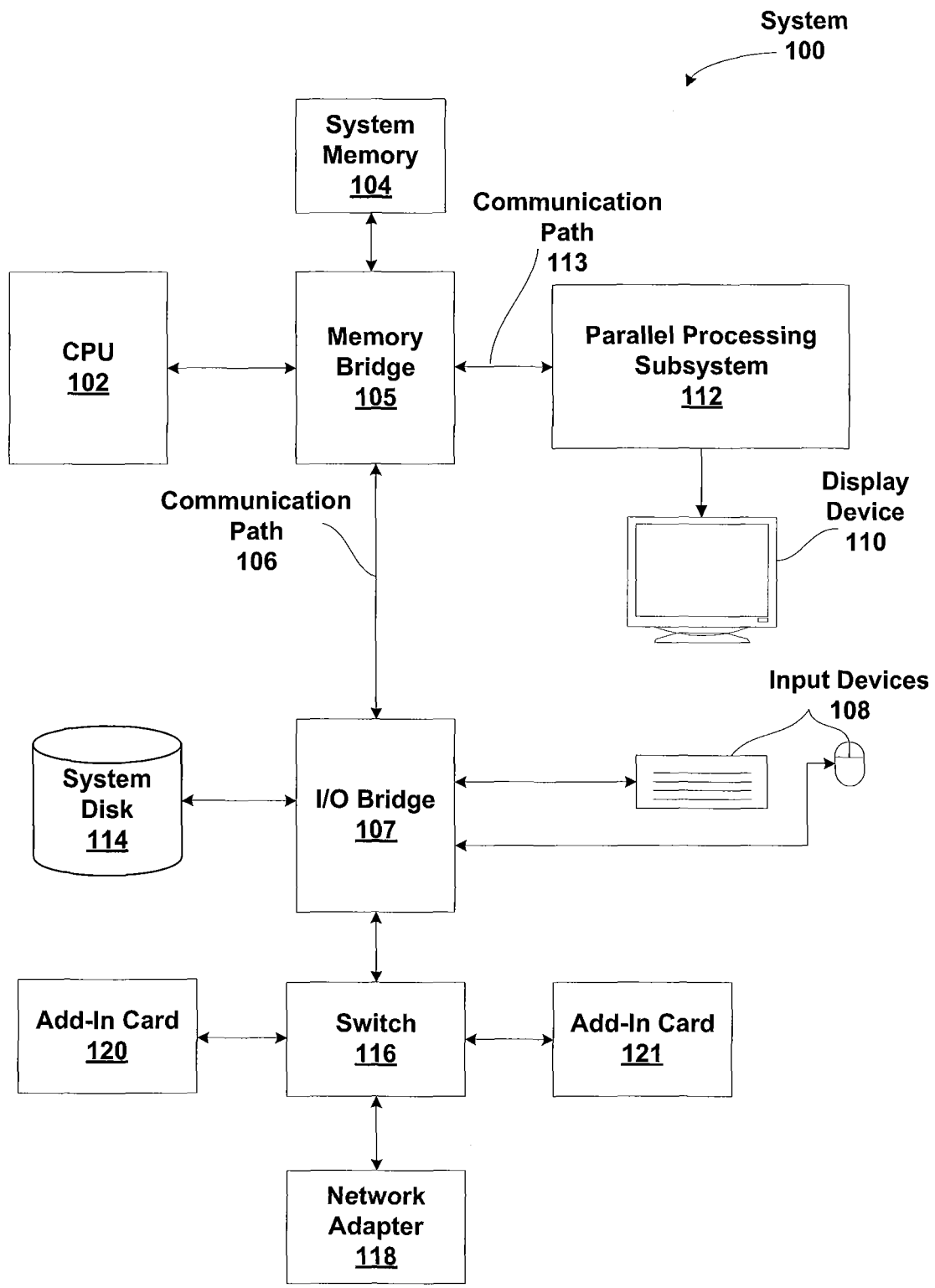
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
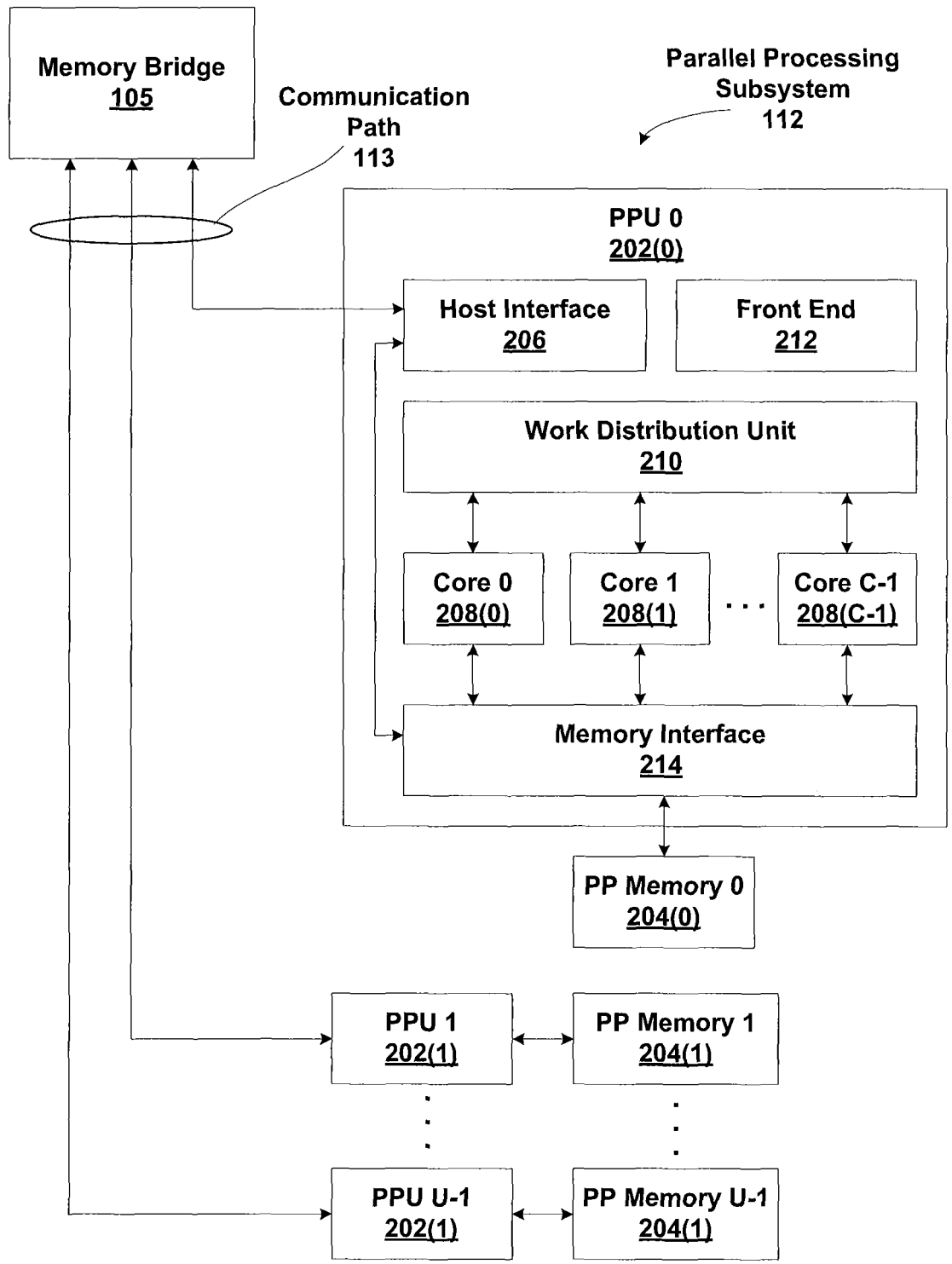
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
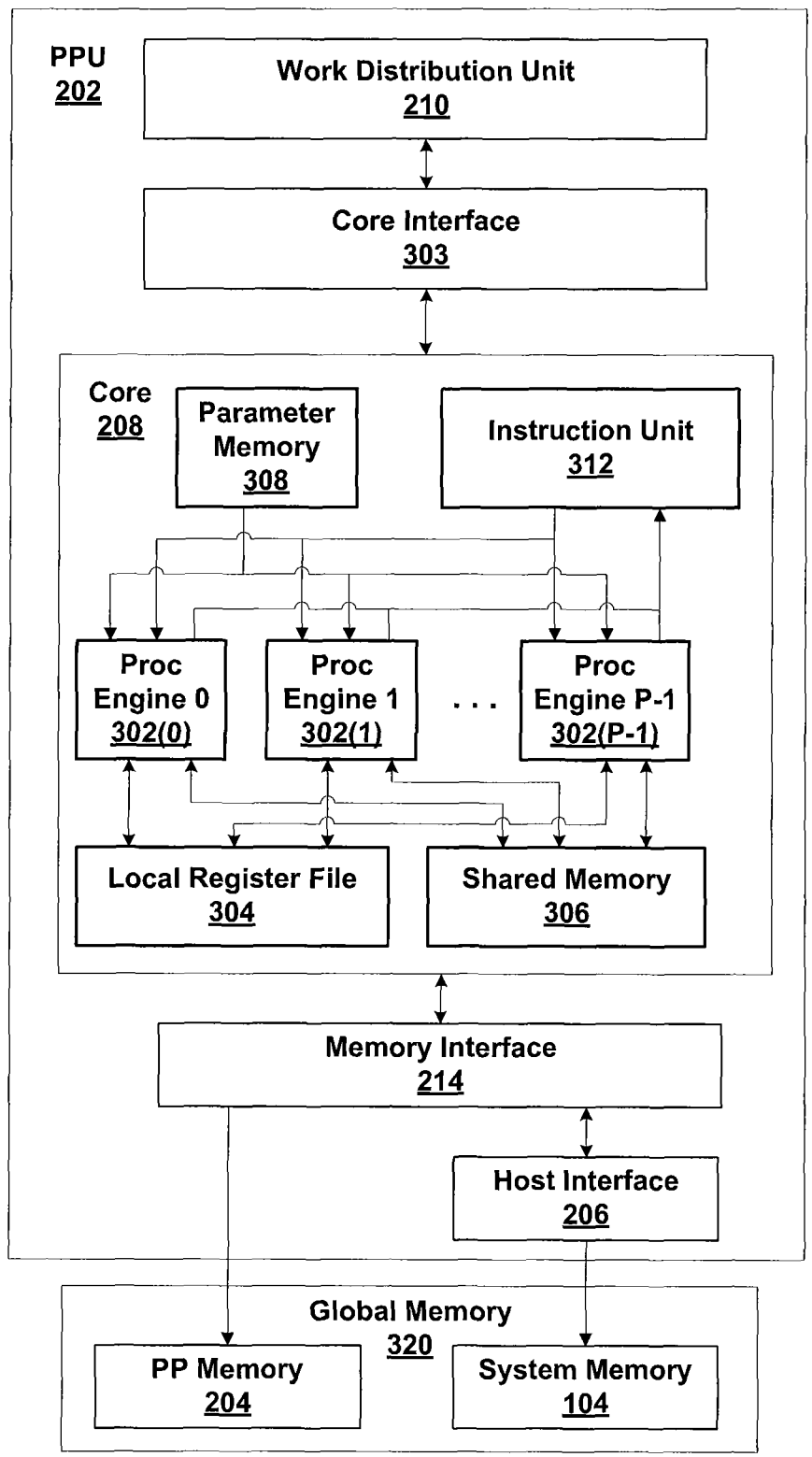
FIG. 3 is a block diagram of a parallel processing unit for the parallel processing subsystem of FIG. 2, according to one embodiment of the invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multi-threaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (n0) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

INSTRUCTION-EFFICIENT PREFIX-SCAN

Figure 4A:
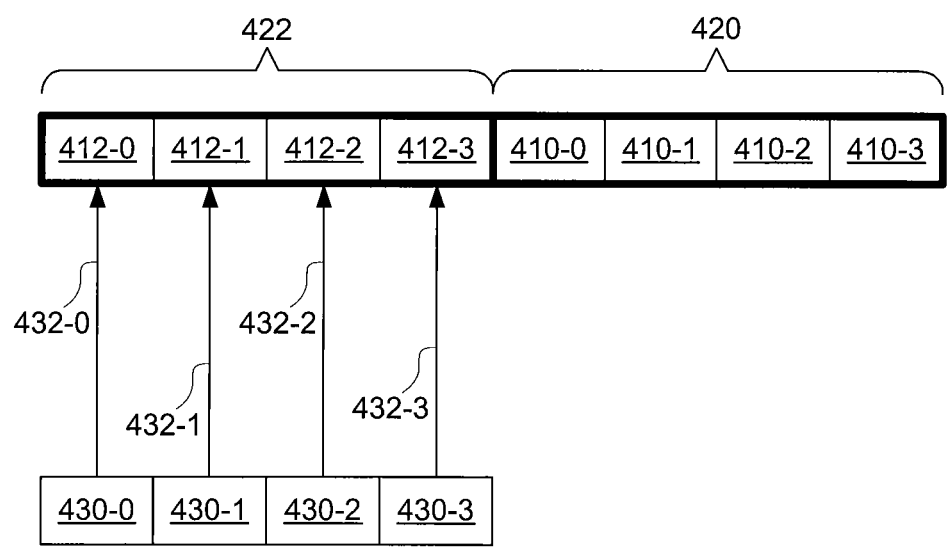
FIG. 4A illustrates a group of threads initializing a set of array elements, according to one embodiment of the invention.

FIG. 4A illustrates a group of threads 430 initializing a set of array elements 412, according to one embodiment of the invention. Each array element 412 is initialized with an identity value 432 by a corresponding thread 430. The array elements 412 collectively form an initialized region 422. Array elements 410 collectively form an output data region 420 of values, where the results of a parallel scan operation may be stored.

Each thread 430 may execute on a processing engine 302 of FIG. 3. A thread group, such as threads 430-0 through 430-3, may execute on a set of processing engines 302 within core 208. A thread group may be used to perform the parallel scan operation described herein. Related data, including the output data region 420 and initialized region 422, as well as any local data or variables, may be stored in the local register file 304, shared memory 306, PP memory 204, system memory 104, or any combination thereof.

Figure 4B:
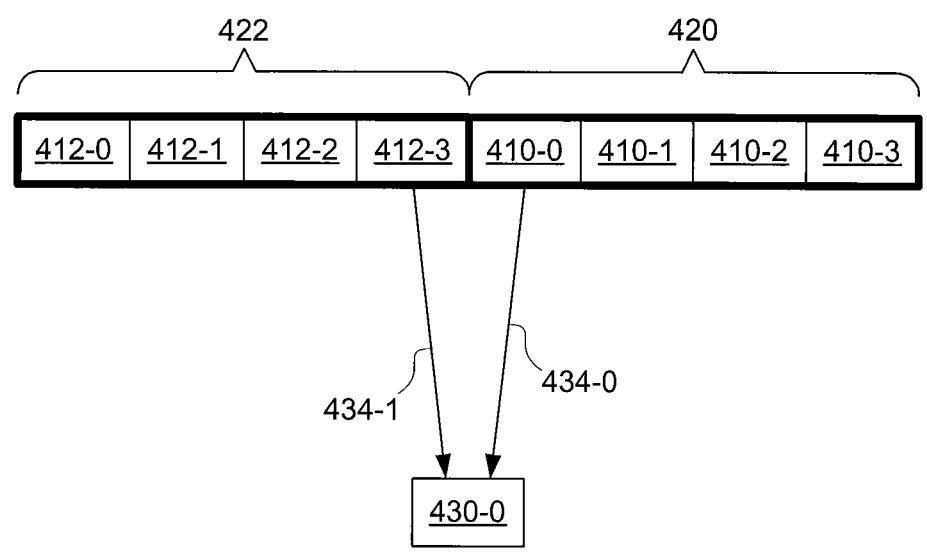
FIG. 4B illustrates an individual thread reading array elements from an initialized region and an output data region using a small offset, according to one embodiment of the invention.

FIG. 4B illustrates an individual thread 430-0 reading array elements 412-3 and 410-0 from the initialized region 422 and the output data region 420, respectively, using a small offset, according to one embodiment of the invention. In the course of normal computation, thread 430-0 may compute an index value that lands within output data region 420. For example, thread 430-0 may compute an index value that selects array element 410-0 within the output data region 420. Thread 430-0 is then able to retrieve the contents of array element 410-0, including data value 434-0.

In the course of normal computation, thread 430-0 may also compute an index value that lands outside of output data region 420, but within the initialized region 422. Any technically feasible technique may be employed to guarantee that any computed index value lands within either output data region 420 or initialized region 422. In a parallel scan operation, computed index values that conventionally go out of bounds naturally land within the initialized region 422. In this example, thread 430-0 computes a conventionally out-of-bounds index, which points to element 412-3 within the initialized region 422. Rather than execute conditional statements to perform bounds checking, thread 430-0 is able to directly retrieve identity value 434-1 from the initialized region 422. For a parallel scan operation, thread 430-0 may add the values of 434-0 and 434-1 together and store the resulting sum in data element 410-0.

Figure 4C:
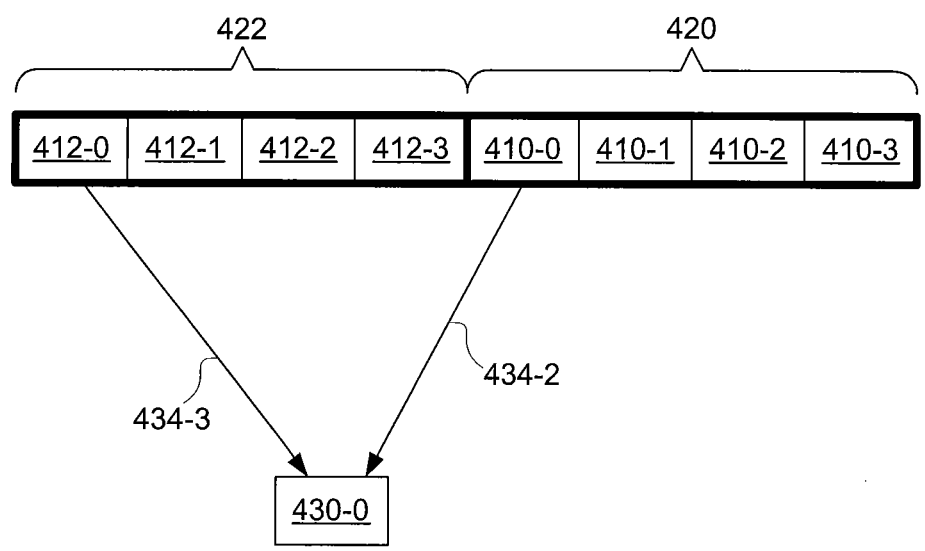
FIG. 4C illustrates an individual thread reading array elements from the initialized region and the output data region using a large offset, according to one embodiment of the invention.

FIG. 4C illustrates an individual thread 430-0 reading array elements 412-0, 410-0 from the initialized region 422 and the output data region 420 using a large offset, according to one embodiment of the invention. This scenario is similar to FIG. 4B, except the offset between the two indices used by thread 430-0 to retrieve values 434-2 and 434-3 spans, but does not exceed, the entire initialized region 422.

Figure 5:
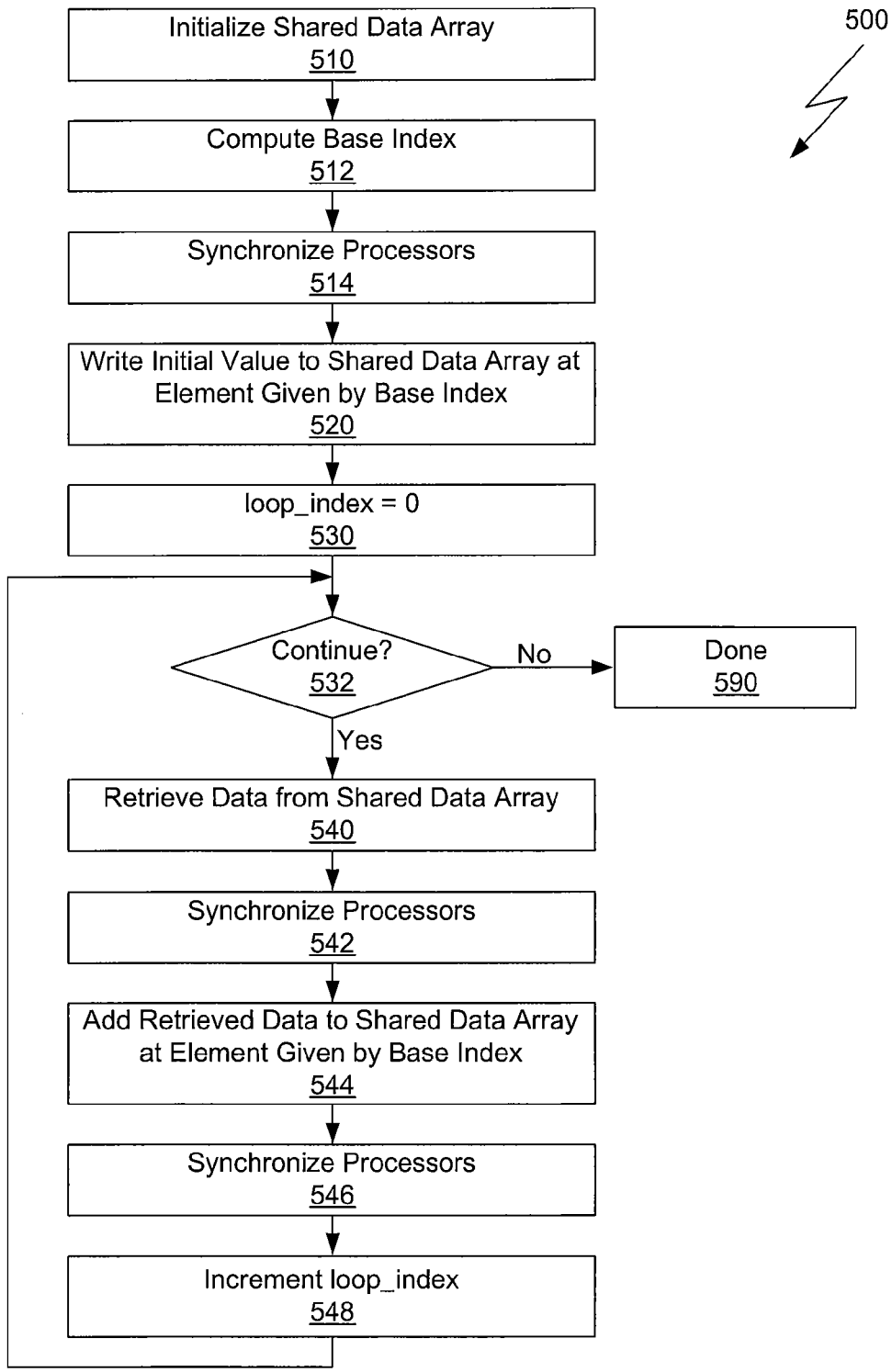
FIG. 5 is a flow diagram of method steps for performing a parallel scan operation, according to one embodiment of the invention.

FIG. 5 is a flow diagram of method steps 500 for performing a parallel scan operation, according to one embodiment of the invention. Although the method steps are described in conjunction with the systems of FIGS. 1, 2, and 3, persons skilled in the art will understand that any system that performs the method steps, in any order, is within the scope of the invention.

Each thread within a related thread group performs the method steps described below on selected elements of a data to collectively generate an output array of data, according to the definition of the parallel scan operation. Each participating thread includes a local data element, which corresponds to one element in a list of input elements to the parallel scan algorithm. The participating threads act on a shared data array, which includes an output data region and an initialized region, such as output data region 420 and initialized region 422 of FIG. 4, respectively.

The method begins in step 510, where a thread initializes a corresponding element within the shared data array. For example, thread 430-0 may initialize element 412-0 of the initialized region 422, and thread 430-1 may initialize element 412-1 of the initialized region, and so forth. A thread index, such as the thread identification number (thread ID), discussed previously, may be used to associate the thread to an element within the initialized region.

In step 512, the thread computes a base index by adding the thread index of the thread to the number of participating threads. In step 514, the thread performs a "synchronize processors" operation, where each thread is synchronized with the other threads within the thread group. The synchronization operation involves waiting for the other participating threads to reach the same point of execution before continuing, thereby assuring coherent state across all the participating threads.

In step 520, the thread writes the local data element, as an initial value, to the shared data array at the data element given by the base index, computed in step 512. In step 530, a loop index variable is set to zero.

In step 532, a continuation decision is made using the loop index variable and a maximum reduction number. The maximum reduction number is computed as a ceiling function of the base-two logarithm of the number of data elements (N) to be processed. If the loop index is less than the maximum reduction number, then the continuation decision succeeds, and method continues to step 540.

In step 540, the thread retrieves data from the shared data array and stores the retrieved data in a local temporary variable. The index used to retrieve the data in this step is equal to the base index minus two raised to the loop index. In step 542, the thread performs a "synchronize processors" operation. In step 544, the thread adds the retrieved data (stored in the local temporary variable) to the shared data array at the element given by the base index. In alternate embodiments, associative operators other than addition may be used. In step 546, the thread performs a synchronize processors operation. In step 548, the thread increments the loop index variable by one.

Returning to step 532, if the loop index is equal to the maximum reduction number, then the continuation decision fails and the method terminates in step 590.

In sum, a method for efficiently performing a parallel scan operation on a SIMD parallel processing unit, such as a GPU, is disclosed. Each thread within a thread group executes an initialization step on an extended region of memory associated with a shared data array. Each thread then computes a base index, which defines the data element within the shared data array where the thread stores results. Each thread then writes an initial value to the output data region of the shared data array. After performing these initial steps, each thread then loops over a loop index variable, where the loop index variable ranges from zero to a maximum reduction number minus one. Within the loop, each thread retrieves a data element from the shared data array and adds the retrieved data to the appropriate data element within the shared data array, as indicated by the associated base index for the thread. Each thread is synchronized at appropriate points of execution.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for performing a parallel scan operation, the method comprising:
   computing, by a processing unit, a base index in a shared data array;
   determining that a loop index is less than a maximum reduction number;
   retrieving data from the shared data array at a first location defined by a base index minus two raised to the loop index;
   performing an operation between the data retrieved from the first location in the shared data array and data stored in the shared data array at a second location defined by the base index to generate processed data; and
   storing the processed data in the shared data array at the second location.

2. The method of claim 1, further comprising the step of initializing the shared data array.

3. The method of claim 2, further comprising the step of performing a first processor synchronization operation after the step of computing the base index.

4. The method of claim 3, further comprising the step of writing an initial data value to the shared data array at the second location.

5. The method of claim 4, further comprising the step of performing a second processor synchronization operation after the step of storing the processed data.

6. The method of claim 5, further comprising the step of incrementing the loop index.

7. The method of claim 1, wherein each thread of a thread group performs the steps of computing, determining, retrieving, performing and storing.

8. The method of claim 7, wherein, for each thread in the thread group, the base index is defined as the sum of a thread index associated with the thread and a number of threads in the thread group.

9. The method of claim 8, wherein the maximum reduction number is equal to the base-two logarithm of a number of data elements in the shared data array being processed.

10. The method of claim 1, wherein the operation performed between the data retrieved from the first location and the data stored at the second location is an addition operation.

11. A non-transitory computer-readable medium including instructions that, when executed by a processing unit, cause the processing unit to perform a parallel scan operation, by performing the steps of:
    computing a base index in a shared data array;
    determining that a loop index is less than a maximum reduction number;
    retrieving data from the shared data array at a first location defined by a base index minus two raised to the loop index;
    performing an operation between the data retrieved from the first location in the shared data array and data stored in the shared data array at a second location defined by the base index to generate processed data; and
    storing the processed data in the shared data array at the second location.

12. The computer-readable medium of claim 11, further comprising the step of performing a first processor synchronization operation after the step of computing the base index.

13. The computer-readable medium of claim 12, further comprising the step of writing an initial data value to the shared data array at the second location.

14. The computer-readable medium of claim 13, further comprising the step of performing a second processor synchronization operation after the step of storing the processed data.

15. The computer-readable medium of claim 14, further comprising the step of incrementing the loop index.

16. The computer-readable medium of claim 11, wherein each thread of a thread group performs the steps of computing, determining, retrieving, performing and storing.

17. The computer-readable medium of claim 16, wherein, for each thread in the thread group, the base index is defined as the sum of a thread index associated with the thread and a number of threads in the thread group.

18. The computer-readable medium of claim 17, wherein the maximum reduction number is equal to the base-two logarithm of a number of data elements in the shared data array being processed.

19. The computer-readable medium of claim 11, wherein the operation performed between the data retrieved from the first location and the data stored at the second location is an addition operation.

20. A computing device configured to perform a parallel scan operation, the computing device comprising:
    a memory; and
    a graphics processing unit coupled to the memory, wherein one or more threads execute on the graphics processing unit, each thread configured to:
    compute a base index in a shared data array,
    determine that a loop index is less than a maximum reduction number,
    retrieve data from the shared data array at a first location defined by a base index minus two raised to the loop index,
    perform an operation between the data retrieved from the first location in the shared data array and data stored in the shared data array at a second location defined by the base index to generate processed data, and
    store the processed data in the shared data array at the second location.

* * * * *